(12) United States Patent
Dabbiru et al.

(10) Patent No.: US 10,600,078 B2
(45) Date of Patent: *Mar. 24, 2020

(54) METHODS AND SYSTEMS FOR MEASURING BRAND UPLIFT FOR SEARCH CAMPAIGNS

(71) Applicant: Google Inc., Mountain View, CA (US)

(72) Inventors: Lakshmi Kumar Dabbiru, Sunnyvale, CA (US); Luke Hiro Swartz, San Francisco, CA (US); Dani Suleman, Fremont, CA (US)

(73) Assignee: Google LLC, Mountain View, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/586,009

(22) Filed: May 3, 2017

(65) Prior Publication Data
US 2017/0300963 A1     Oct. 19, 2017

Related U.S. Application Data

(63) Continuation of application No. 14/485,164, filed on Sep. 12, 2014, now Pat. No. 9,679,308.

(51) Int. Cl.
*G06Q 30/00* (2012.01)
*G06Q 30/02* (2012.01)
(Continued)

(52) U.S. Cl.
CPC ..... *G06Q 30/0246* (2013.01); *G06Q 30/0245* (2013.01); *G06Q 30/0256* (2013.01);
(Continued)

(58) Field of Classification Search
CPC .......................... G06Q 30/0243; G06Q 30/02
(Continued)

(56) References Cited

U.S. PATENT DOCUMENTS 9,679,308 B2 *   6/2017  Dabbiru ............ G06Q 30/0246
2014/0344261 A1 * 11/2014  Navta ............... G06F 17/30864
                                                 707/723

FOREIGN PATENT DOCUMENTS

| JP | 2003-233731 | | 8/2003 | |
| JP | 2003233731 A | * | 8/2003 | ............. G06Q 30/02 |
| WO | WO-2008075886 A1 | * | 6/2008 | ............. G06Q 30/02 |

OTHER PUBLICATIONS

Klein, Trevor. One Content Metric to Rule Them All. Jul. 1, 2014. Retrieved online Nov. 8, 2019. https://moz.com/blog/one-metric (Year: 2014).*

(Continued)

*Primary Examiner* — James A Reagan
(74) *Attorney, Agent, or Firm* — Foley & Lardner LLP

(57) ABSTRACT

Systems and methods for measuring brand uplift in a computer networked environment are provided. A data processing system can assign a first set of device identifiers to an experimental arm and a second set of device identifiers to a control arm. Computing devices associated with the experimental arm receive third-party content items promoting a brand for which a brand uplift experiment is performed, while computing devices associated with the control arm do not receive third-party content items promoting the brand. At the end of the experiment, a brand uplift metric value is computed by analyzing search query logs of the computing devices. The brand uplift metric value is then provided to an advertiser for display.

20 Claims, 6 Drawing Sheets

(51) Int. Cl.
*H04L 29/08* (2006.01)
*H04L 29/06* (2006.01)

(52) U.S. Cl.
CPC ......... *G06Q 30/0264* (2013.01); *H04L 67/02* (2013.01); *H04L 67/10* (2013.01); *H04L 67/20* (2013.01); *H04L 67/42* (2013.01)

(58) Field of Classification Search
USPC .................................................. 705/14.042
See application file for complete search history.

(56) References Cited

OTHER PUBLICATIONS

Sirotkin et al. On Search Engine Evaluation Metrics. Apr. 2012. Retrieved online Nov. 8, 2019. https://arxiv.org/ftp/arxiv/papers/1302/1302.2318.pdf (Year: 2012).*

Measuring Brand Lift With Google Consumer Surveys, 2 pgs , Searched via internet at http://adwords.blogspot.com/2013/03/measuring-brand-lift-with-google.html, on Aug. 15, 2014.

Measuring Brand Lift, 7 pgs, searched via internet at http://viget.com/advance/measuring-brand-lift , on Aug. 15, 2014.

U.S. Notice of Allowance on U.S. Appl. No. 14/485,164 dated Feb. 2, 2017.

U.S. Office Action on U.S. Appl. No. 14/485,164 dated Jul. 18, 2016.

\* cited by examiner

METHODS AND SYSTEMS FOR MEASURING BRAND UPLIFT FOR SEARCH CAMPAIGNS

CROSS-REFERENCE TO RELATED PATENT APPLICATION

The present application is a continuation of and claims priority to U.S. patent application Ser. No. 14/485,164, entitled "METHODS AND SYSTEMS FOR MEASURING BRAND UPLIFT FOR SEARCH CAMPAIGNS", filed Sep. 12, 2014, which is incorporated herein by reference in its entirety.

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

At least one aspect is directed to a computer implemented method for measuring brand uplift in a computer network environment. According to one aspect, a data processing system including one or more processors can receive a plurality of requests for content from a plurality of computing devices associated with device identifiers. The data processing system can identify, for each of the plurality of requests for content, a third-party content item of a first set of content items suitable for display with the content associated with the request. Each of the first set of content items identifies a first brand. The data processing system can determine that a first brand promoted by the identified third-party content item is participating in a brand uplift experiment. The data processing system can determine, responsive to receiving the requests for content, to display third-party content items of the first set of content items to a first subset of the plurality of computing devices, the first subset of the plurality of computing devices associated with a first subset of the device identifiers. The data processing system can provide, for display, the third-party content items of the first set of content items at the first subset of the plurality of computing devices responsive to determining to display the third-party content items of the first set of content items to the first subset of the plurality of computing devices. The data processing system can determine to not display the first set of content items to a remaining subset of the plurality of computing devices that are associated with a remaining subset of the device identifiers. The data processing system can select, for the remaining subset of the plurality of computing devices, third-party content items of a second set of content items, none of the second set of content items identifying the first brand. The data processing system can identify, from a search query log including search queries associated with the device identifiers corresponding to the plurality of computing devices, a portion of the first subset of device identifiers that performed a search using a search query that included a keyword from a predetermined set of brand keywords associated with the first brand. The data processing system can determine a first brand awareness metric value based on a ratio of a number of device identifiers in the portion of the first subset of device identifiers to a total number of device identifiers in the first subset of device identifiers. The data processing system can identify, from the search query log, a portion of the second subset of device identifiers that performed a search using a search query that included a keyword from the predetermined set of brand keywords associated with the first brand. The data processing system can determine a second brand awareness metric value based on a ratio of a number of device identifiers in the portion of the second subset of device identifiers to a total number of device identifiers in the second subset of device identifiers. The data processing system can compute a brand uplift metric value indicating an uplift in brand awareness of the first brand identified by the first set of content items based on the first brand awareness metric value and the second brand awareness metric value. The data processing system can display, to a content provider of the first set of content items, data based on the brand uplift metric value indicating the uplift in brand awareness of the first brand.

In some implementations, the search query log includes search queries associated with a device identifier that were submitted with a search request after the third-party content item of the first set of content items was displayed at a computing device associated with the device identifier.

In some implementations, determining the first brand awareness metric value includes providing, to the first subset of device identifiers, a survey including information associated with the first brand, receiving, from the first subset of device identifiers, survey responses and determining, from the survey responses, a ratio of a number of device identifiers in a portion of the first subset of device identifiers that identified the brand to the total number of device identifiers in the first subset of device identifiers, the first brand awareness metric value based on the determined ratio.

In some implementations, determining the second brand awareness metric value includes providing, to the second subset of device identifiers, a survey including information associated with the first brand, receiving, from the second subset of device identifiers, survey responses and determining, from the survey responses, a ratio of a number of device identifiers in a portion of the second subset of device identifiers that identified the first brand to the total number of device identifiers in the second subset of device identifiers, the second brand awareness metric value based on the determined ratio.

In some implementations, the data processing system can maintain, for the first subset of device identifiers, a counter identifying a number of computing devices associated with the first subset of device identifiers on which any of the third-party content items of the first set of content items was displayed and increment the counter when a content item receives a valid impression on a computing device on which none of the first set of content items has previously received a valid impression. In some such implementations, incrementing the counter when a content item receives a valid impression on a computing device on which none of the first set of content items has previously received a valid impression includes determining, responsive to displaying one of the third-party content items of the first set of content items at the first subset of the plurality of computing devices, a length of time from a time a third-party content items of the first set of content items was displayed on an information resource and a request to access another content item included in the information resource is received and determining that the length of time is above a threshold length of time.

In some implementations, the data processing system can generate the predetermined set of brand keywords associated with the first brand by analyzing content associated with the first brand.

At least one aspect is directed to a system of measuring brand uplift in a computer network environment. The system includes a data processing system including a content selection module and a brand uplift calculation module. The data processing system can identify, for each of the plurality of requests for content, a third-party content item of a first set of content items suitable for display with the content associated with the request. Each of the first set of content items identifies a first brand. The data processing system can determine that a first brand promoted by the identified third-party content item is participating in a brand uplift experiment. The data processing system can determine, responsive to receiving the requests for content, to display third-party content items of the first set of content items to a first subset of the plurality of computing devices, the first subset of the plurality of computing devices associated with a first subset of the device identifiers. The data processing system can provide, for display, the third-party content items of the first set of content items at the first subset of the plurality of computing devices responsive to determining to display the third-party content items of the first set of content items to the first subset of the plurality of computing devices. The data processing system can determine to not display the first set of content items to a remaining subset of the plurality of computing devices that are associated with a remaining subset of the device identifiers. The data processing system can select, for the remaining subset of the plurality of computing devices, third-party content items of a second set of content items, none of the second set of content items identifying the first brand. The data processing system can identify, from a search query log including search queries associated with the device identifiers corresponding to the plurality of computing devices, a portion of the first subset of device identifiers that performed a search using a search query that included a keyword from a predetermined set of brand keywords associated with the first brand. The data processing system can determine a first brand awareness metric value based on a ratio of a number of device identifiers in the portion of the first subset of device identifiers to a number of total device identifiers in the first subset of device identifiers. The data processing system can identify, from the search query log, a portion of the second subset of device identifiers that performed a search using a search query that included a keyword from the predetermined set of brand keywords associated with the first brand. The data processing system can determine a second brand awareness metric value based on a ratio of a number of device identifiers in the portion of the second subset of device identifiers to a number of total device identifiers in the second subset of device identifiers. The data processing system can compute a brand uplift metric value indicating an uplift in brand awareness of the first brand identified by the first set of content items based on the first brand awareness metric value and the second brand awareness metric value. The data processing system can display, to a content provider of the first set of content items, data based on the brand uplift metric value indicating the uplift in brand awareness of the first brand.

At least one aspect is directed to a computer readable storage medium storing instructions that when executed by one or more data processors, cause the one or more data processors to perform operations. The data processing system can identify, for each of the plurality of requests for content, a third-party content item of a first set of content items suitable for display with the content associated with the request. Each of the first set of content items identifies a first brand. The data processing system can determine that a first brand promoted by the identified third-party content item is participating in a brand uplift experiment. The data processing system can determine, responsive to receiving the requests for content, to display third-party content items of the first set of content items to a first subset of the plurality of computing devices, the first subset of the plurality of computing devices associated with a first subset of the device identifiers. The data processing system can provide, for display, the third-party content items of the first set of content items at the first subset of the plurality of computing devices responsive to determining to display the third-party content items of the first set of content items to the first subset of the plurality of computing devices. The data processing system can determine to not display the first set of content items to a remaining subset of the plurality of computing devices that are associated with a remaining subset of the device identifiers. The data processing system can select, for the remaining subset of the plurality of computing devices, third-party content items of a second set of content items, none of the second set of content items identifying the first brand. The data processing system can identify, from a search query log including search queries associated with the device identifiers corresponding to the plurality of computing devices, a portion of the first subset of device identifiers that performed a search using a search query that included a keyword from a predetermined set of brand keywords associated with the first brand. The data processing system can determine a first brand awareness metric value based on a ratio of a number of device identifiers in the portion of the first subset of device identifiers to a number of total device identifiers in the first subset of device identifiers. The data processing system can identify, from the search query log, a portion of the second subset of device identifiers that performed a search using a search query that included a keyword from the predetermined set of brand keywords associated with the first brand. The data processing system can determine a second brand awareness metric value based on a ratio of a number of device identifiers in the portion of the second subset of device identifiers to a number of total device identifiers in the second subset of device identifiers. The data processing system can compute a brand uplift metric value indicating an uplift in brand awareness of the first brand identified by the first set of content items based on the first brand awareness metric value and the second brand awareness metric value. The data processing system can display, to a content provider of the first set of content items, data based on the brand uplift metric value indicating the uplift in brand awareness of the first brand.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
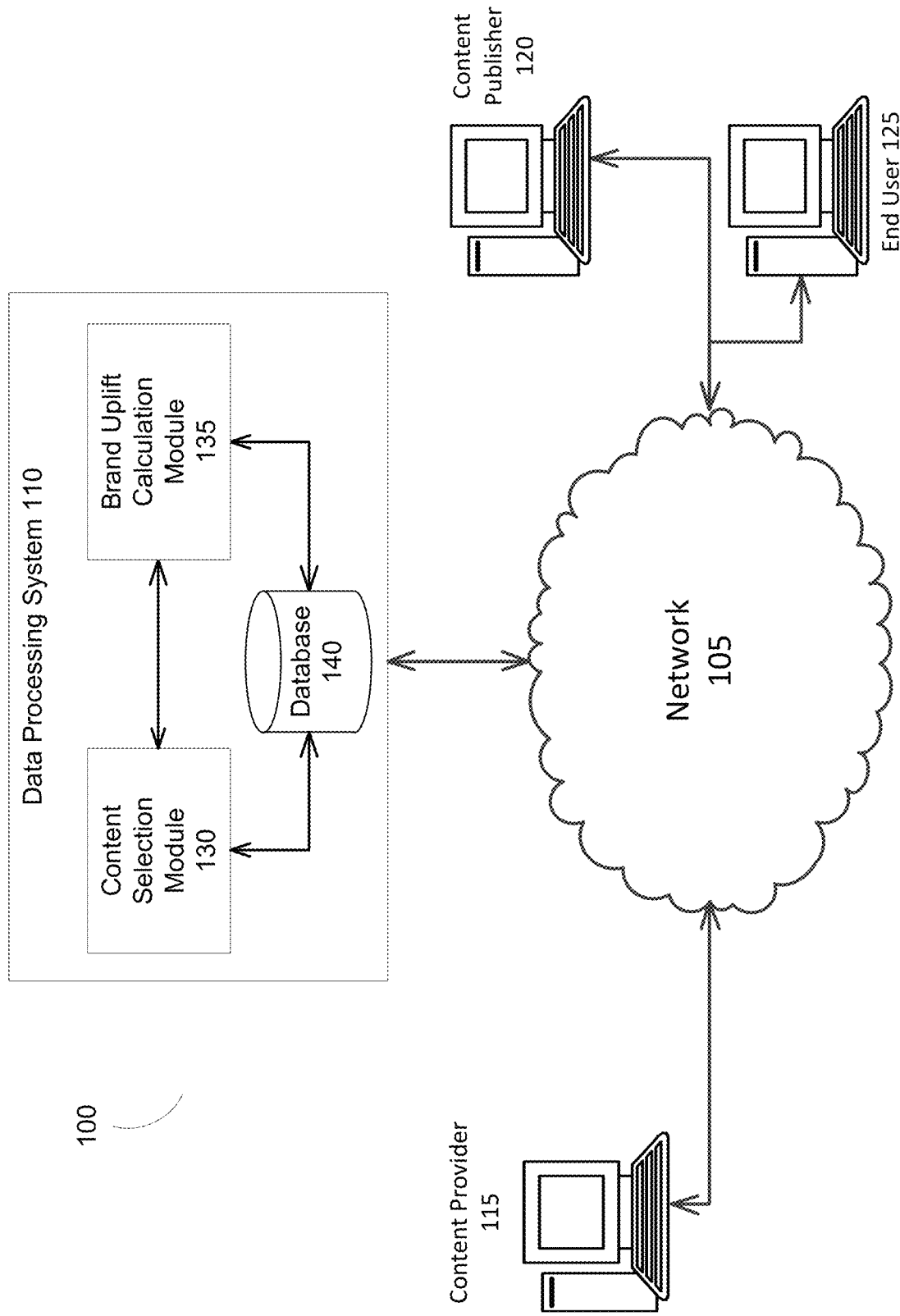
FIG. 1 is a block diagram depicting one implementation of an environment for measuring brand uplift for search campaigns, according to an illustrative implementation.

Following below are more detailed descriptions of various concepts related to, and implementations of, methods, apparatuses, and systems of measuring brand uplift for search campaigns in a computer network environment. The various concepts introduced above and discussed in greater detail below may be implemented in any of numerous ways, as the described concepts are not limited to any particular manner of implementation.

Third-party content providers, such as advertisers, may focus their advertising campaigns on various goals, including but not limited to performance advertising and brand advertising. Traditionally, advertisers whose ads are displayed in response to search queries are focused on performance advertising, in which the goal of the ads is primarily to direct a user to a landing page of the ad. However, ads that are displayed on search result web pages can also indirectly create brand advertising opportunities for the advertiser. One purpose of brand advertising is to increase brand awareness to consumers. As such, with brand advertising, advertisers may not necessarily care about a click through rate as the goal is not necessarily to convert a consumer into a customer, but simply to increase the awareness of the brand associated with the advertiser. For instance, a user may submit a search query "transfer money to India." In response to the search query, ads from various brands may be displayed along with search results generated by the search engine. Although the user may not click on any of the ads displayed on the search results page, the user may view the ads and the brands identified in the ads such that the user may recall one or more of the brands when performing a future search relating to transferring money to India.

At present, there are not enough measurement metrics to quantify the impact that search ads contribute towards brand advertising. The present disclosure aims to address this by providing experimental methodologies to find effective metrics to measure brand metrics like brand recall and brand awareness for search advertising.

Systems and methods of the present disclosure relate generally to measuring brand uplift for search campaigns in a computer network environment. A data processing system including one or more processors can receive a plurality of requests for content from a plurality of computing devices associated with device identifiers. The data processing system can identify, for each of the plurality of requests for content, a third-party content item of a first set of content items suitable for display with the content associated with the request. Each of the first set of content items identifies a first brand. The data processing system can determine that a first brand promoted by the identified third-party content item is participating in a brand uplift experiment. The data processing system can determine, responsive to receiving the requests for content, to display third-party content items of the first set of content items to a first subset of the plurality of computing devices, the first subset of the plurality of computing devices associated with a first subset of the device identifiers. The data processing system can provide, for display, the third-party content items of the first set of content items at the first subset of the plurality of computing devices responsive to determining to display the third-party content items of the first set of content items to the first subset of the plurality of computing devices. The data processing system can determine to not display the first set of content items to a remaining subset of the plurality of computing devices that are associated with a remaining subset of the device identifiers. The data processing system can select, for the remaining subset of the plurality of computing devices, third-party content items of a second set of content items, none of the second set of content items identifying the first brand. The data processing system can identify, from a search query log including search queries associated with the device identifiers corresponding to the plurality of computing devices, a portion of the first subset of device identifiers that performed a search using a search query that included a keyword from a predetermined set of brand keywords associated with the first brand. The data processing system can determine a first brand awareness metric value based on a ratio of the portion of the first subset of device identifiers to the first subset of device identifiers. The data processing system can identify, from the search query log, a portion of the second subset of device identifiers that performed a search using a search query that included a keyword from the predetermined set of brand keywords associated with the first brand. The data processing system can determine a second brand awareness metric value based on a ratio of the portion of the second subset of device identifiers to the second subset of device identifiers. The data processing system can compute a brand uplift metric value indicating an uplift in brand awareness of the first brand identified by the first set of content items based on the first brand awareness metric value and the second brand awareness metric value. The data processing system can display, to a content provider of the first set of content items, the brand uplift metric value indicating the uplift in brand awareness of the first brand.

FIG. 1 is a block diagram depicting one implementation of an environment for measuring brand uplift for search campaigns. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content selection module 130, at least one brand uplift calculation module 135, and at least one database 140. The content selection module 130 and brand uplift calculation module 135 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The content selection module 130 and brand uplift calculation module 135 can include or execute at least one computer program or at least one script. The content selection module 130 and brand uplift calculation module 135 can be separate components, a single component, or part of the data processing system 110. The content selection module 130 and brand uplift calculation module 135 can include combinations of software and hardware, such as one or more processors configured to execute one or more scripts to receive a plurality of requests for content from a plurality of computing devices associated with device identifiers, identify, for each of the plurality of requests for content, a third-party content item of a first set of content items suitable for display with the content associated with the request, determine that a first brand promoted by the identified third-party content item is participating in a brand uplift experiment, determine, responsive to receiving the requests for content, to display third-party content items of the first set of content items to a first subset of the plurality of computing devices, the first subset of the plurality of computing devices associated with a first subset of the device identifiers, provide, for display, the third-party content items of the first set of content items at the first subset of the plurality of computing devices responsive to determining to display the third-party content items of the first set of content items to the first subset of the plurality of computing devices, determine to not display the first set of content items to a remaining subset of the plurality of computing devices that are associated with a remaining subset of the device identifiers, select, for the remaining subset of the plurality of computing devices, third-party content items of a second set of content items, none of the second set of content items identifying the first brand, identify, from a search query log including search queries associated with the device identifiers corresponding to the plurality of computing devices, a portion of the first subset of device identifiers that performed a search using a search query that included a keyword from a predetermined set of brand keywords associated with the first brand, determine a first brand awareness metric value based on a ratio of the portion of the first subset of device identifiers to the first subset of device identifiers, identify, from the search query log, a portion of the second subset of device identifiers that performed a search using a search query that included a keyword from the predetermined set of brand keywords associated with the first brand, determine a second brand awareness metric value based on a ratio of the portion of the second subset of device identifiers to the second subset of device identifiers, compute a brand uplift metric value indicating an uplift in brand awareness of the first brand identified by the first set of content items based on the first brand awareness metric value and the second brand awareness metric value, display, to a content provider of the first set of content items, the brand uplift metric value indicating the uplift in brand awareness of the first brand, for example.

The data processing system can also include one or more content repositories or databases 140. The databases 140 can be local to the data processing system 110. In some implementations, the databases 140 can be remote to the data processing system 110 but can communicate with the data processing system 110 via the network 105. The databases 140 can store reservations for a plurality of content slots available for reservation on a plurality of information resources as well as store availability schedules for the plurality of content slots. Additional details of the contents of the databases 140 will be provided below.

The data processing system 110 can be configured to establish a brand uplift experiment for one or more third-party content providers 115 or advertisers. In some implementations, the data processing system 110 can receive a request from an advertiser to establish a brand uplift experiment. The data processing system 110 can receive a list of brand keywords identifying one or more keywords that the advertiser either associates or is likely to associate with the brand. The data processing system 110 can receive the list from the advertiser. In some implementations, the data processing system 110 can generate the list of brand keywords by analyzing the advertiser's web pages. In some implementations, the data processing system 110 can also generate the list of brand keywords by analyzing the advertiser's third-party content items that the advertiser has provided for selection to display at end user computing devices 125. Generally, the brand keywords can include keywords that are trademarks of the advertiser, keywords or phrases commonly attributed to the brand, or other keywords or phrases that the advertiser believes uniquely identifies the brand from other competing brands.

In addition, the advertiser may select one or more parameters for the brand uplift experiment. In some implementations, the advertiser can limit the scope of the brand uplift experiment to include end user computing devices or users based on geography, time of day, and type of device, among others. In some implementations, the advertiser may also limit the scope of the experiment to end user computing devices or users having certain characteristics. In some implementations, the data processing system 110 can establish the parameters of the brand uplift experiment without receiving input from the advertiser. In some implementations, the brand uplift experiment can be set up so that only a predetermined number of content placement opportunities are used towards the experiment to increase the number of impressions third-party content items of the advertiser may receive.

To the extent that the systems discussed here receive or collect personal information about visitors, or may make use of personal information, the visitors may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In establishing the brand uplift experiment for a given advertiser, the data processing system 110 can identify third-party content items of the advertiser that are participating in the experiment. These content items may be selected for display but eventually not displayed by virtue of being involved in the experiment. In some implementations, the third-party content items can be designed or configured to include content, such as keywords, that identify the advertiser. In some implementations, the third-party content items can be designed or configured to include content that includes one or more brand keywords.

Once the brand uplift experiment is live, the data processing system 110 can begin running the experiment. In general operation of the data processing system 110, the data processing system 110 is receiving requests to provide content to a plurality of end user computing devices associated with unique device identifiers. The data processing system 110 can receive the request and identify a search query included in the request. Using the search query, the data processing system 110 can identify third-party content items that are deemed relevant to display at the end user computing device associated with the search query. In some implementations, a third-party content item can be deemed relevant to a search query if the advertiser of the third-party content item placed a bid to serve the third-party content item with one or more of the keywords in the search query. For instance, if the search query is "money transfer to India," the advertiser can identify a plurality of third-party content items that have bid on one or more keywords "money transfer," "transfer money," "money transfer to India" and "transfer money to India." In typical operation, the data processing system 110 may be configured to select the third-party content items having the highest scores, which can be based on the bid of the content item and the relevancy of the content item to the search query. In some implementations, the data processing system 110 can select a predetermined number of content items to display with the search results corresponding to the search query. The content items may be positioned on the display based on their scores.

Figure 2A:
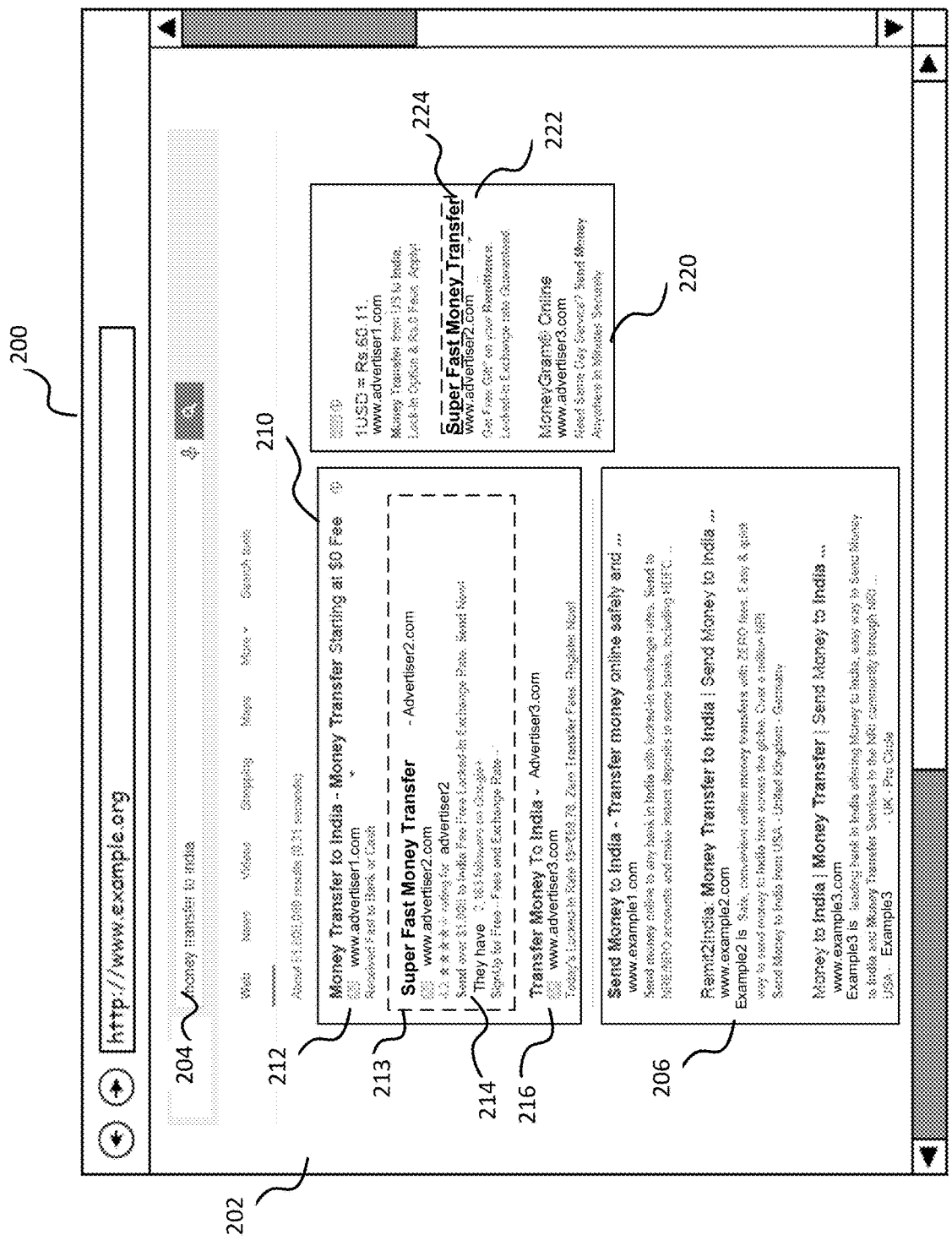
FIG. 2A is a display depicting an online search result document including a third-party content item identifying a first brand, according to an illustrative implementation.

Referring briefly to FIG. 2A, a display depicting an online search result document including a third-party content item identifying a first brand is shown. The display 200 includes a search results information resource 202. The search results information resource includes a search query input region 204, a search results content region 206 in which search results are displayed and one or more third-party content regions 210 and 220 that are configured to include one or more third-party content items. The content region 210 can be positioned above the search results content region 206 and can include one or more third-party content slots, such as the content slot 213. The third-party content region 210 includes a first third-party content item 212 corresponding to an ad provided by a first advertiser, "Advertiser1," a second third-party content item 214 corresponding to an ad provided by a second advertiser, "Advertiser2," that is provided in the content slot 213, and a third third-party content item 216 corresponding to an ad provided by a third advertiser, "Advertiser3." Moreover, the search results information resource 202 also includes another third-party content region 220 that includes a plurality of third-party content items provided by the three advertisers that provided content items in the third-party content region 210. The data processing system 110 can be configured to select the third-party content items displayed in the regions 210 and 220.

Now, referring again also to FIG. 1, the content selection module 130 of the data processing system 110 can be configured to identify a third-party content item that corresponds to a brand participating in a brand uplift experiment and determine whether to provide the third-party content item for display at an end user computing device associated with the search request by which the data processing system 110 identified the third-party content item. The content selection module 130 can determine whether or not to provide the content item for display based on whether a device identifier of the end user computing device is assigned to an experimental arm or a control arm of the brand uplift experiment corresponding to the brand which the content item is promoting.

The content selection module 130 can be configured to receive a plurality of requests for content from a plurality of computing devices associated with device identifiers. Each request corresponds to a request to provide third-party content items for display at an end user computing device. Each request can identify a search query based on which the content selection module 130 is configured to select content items. The request also identifies a device identifier, which the content selection module 130 can use to determine whether or not to provide one or more of the content items selected by the content selection module.

The content selection module 130 can receive a request for content in response to a request from an end user computing device. In a typical flow of events, an end user, via the end user computing device 125, can submit a search query in a search query information resource, such as a web page that includes a search query input region in which a search query can be inserted. In some implementations, the search query input region can be a part of a web browser executing on the end user computing device 125. The end user computing device 125 can transmit the search query to a content publisher, such as the content publisher 120 associated with the search query input region. The content publisher 120 can then generate search results based on the search query and generate a search results information resource that includes the search results. The content publisher 120 can provide the search results information resource to the end user computing device 125, which then displays the contents of the search results information resource on a display of the end user computing device 125. The content publisher 120 can configure the search results information resource to include one or more content slots that are configured to display third-party content items within the content slots. These content slots can be located at various locations within the search results information resource.

The request for content can include a request to provide third-party content alongside search results that are to be displayed in a search results information resource. In some implementations, the requests for content can be received directly from end user computing devices associated with device identifiers. In some implementations, the requests for content can be received via another entity, such as the content publisher responsive to the content publisher receiving a request for search results based on a search query. In some implementations, the end user computing device 125 can transmit the request for search results based on the search query to the content publisher 120 via the network 105. In turn, the content publisher 120 can transmit a request to the data processing system 110 for third-party content items to provide in the search results information resource including the search results generated by the content publisher responsive to the search query. The content selection module 130 can then select one or more third-party content items provided by third-party content providers 115 for display on the search results information resource. Details of the selection process are provided herein.

In some implementations, the request for search results generated by the end user computing device 125 can include the search query. In addition, the request for search results can include a device identifier identifying the end user computing device 125. In some implementations, the device identifier can be unique to the end user computing device. In some implementations, the device identifier can be unique to a user of the end user computing device. In some implementations, the device identifier can be unique to a particular application, for example, a web browser of the end user computing device. The request for third-party content received by the data processing system 110 can include the device identifier associated with the end user computing device 125 that requested search results. In some implementations, the end user computing device 125 can transmit the request for third-party content to the data processing system 110. In some implementations, the content publisher 120 receiving the request for search results from the end user computing device 125 can transmit the request for third-party content to the data processing system 110.

Responsive to receiving a given request of the plurality of requests for third-party content, the content selection module 130 can identify the search query included in the request and the device identifier identified in the request. The content selection module 130 can then identify, via an advertising auction system, one or more third-party content items that are suitable for display with the search results. In some implementations, the content selection module 130 can identify third-party content items via an auction. In some implementations, an auction can be based on the search query, such that advertisers can provide bids to serve third-party content items on the same information resource as search results to the search query provided by the content publisher. The highest bidding content items may then be selected for display.

In some implementations, the content selection module 130 can identify, for the given request, at least one third-party content item of a first set of content items suitable for display on the information resource including the search results to the search query. Each of the first set of content items can identify a brand participating in a brand uplift experiment. For a given third-party content item of the third-party content items of the first set of content items identified by the content selection module 130 as suitable for display with search results corresponding to the search query, the content selection module 130 can determine the brand the third-party content item is promoting. The content selection module 130 can do so by analyzing the content of the third-party content item or by analyzing the web address or contents of the landing page to which the third-party content item is linked. In some implementations, the content selection module 130 can determine the brand or advertiser the third-party content item is promoting by identifying an advertisement campaign in which the third-party content item is included.

The content selection module 130 can be configured to determine that the brand corresponding to the third-party content item is participating in a brand uplift experiment. Once the content selection module 130 determines the identity of the brand or advertiser associated with the content item as described above, the content selection module 130 can determine if the brand is participating in a brand uplift experiment. In some implementations, the content selection module 130 can perform a lookup in a database or table that includes a list of brands that are participating in a brand uplift experiment. If the brand is included in the list of brands, the content selection module 130 can determine that the brand is participating in a brand uplift experiment.

The content selection module 130 can be configured to identify, for the given request, one or more of the identified third-party content items that are associated with a brand that is participating in a brand uplift experiment. To do so, the content selection module 130 can identify, for each of the identified third-party content items, the brand associated with the third-party content item. If the third-party content item is not associated with a brand on a list of brands participating in a brand uplift experiment, the content selection module 130 can determine that the third-party content item can be provided for display. Conversely, if the third-party content item is associated with a brand on the list of brands participating in a brand uplift experiment, the content selection module 130 has to execute a set of instructions corresponding to the brand uplift experiment. In some implementations, the content selection module 130 can maintain a list of brands that are participating in a brand uplift experiment. It should be appreciated that the third-party content items can include content that identifies a particular brand. In some implementations, the third-party content item can include text that identifies a brand or one or more keywords that can be associated with the brand. In some implementations, the third-party content item can be an image ad that includes an image that includes content that can be identified with a particular brand.

In some implementations, the content selection module 130 can run multiple brand uplift experiments at any given time and therefore, may need to check if any of the third-party content items identified by the content selection module 130 are associated with a brand participating in brand uplift experiment. In some implementations, the content selection module 130 can identify, for each third-party content item identified by the content selection module that is suitable for display with the search results, a brand associated with the third-party content item and determine if the brand is participating in the brand uplift experiment.

In some implementations, the brand uplift experiment can have two arms, an experimental arm and a control arm. The experimental arm can include a first set of device identifiers, while the control arm can include a second set of device identifiers different from the first set of identifiers. The brand uplift experiment can be specific to a particular brand or advertiser. Each brand uplift experiment can correspond to a list of brand keywords associated with the brand for which the brand uplift experiment is being performed. As described above, the list of brand keywords can be generated by the data processing system 110 or received from another entity, such as the advertiser. A brand keyword can be a keyword that identifies the brand associated with the brand uplift experiment. In some implementations, the brand keyword can be a trademark, keyword, phrase, acronym, or set of characters or words that the brand or advertiser associates with the brand itself. In some implementations, the data processing system 110 can generate a list of brand keywords for the advertiser of the brand uplift experiment by crawling one or more websites of the advertiser or brand associated with the brand uplift experiment.

In response to determining that a third-party content item identified by the content selection module 130 is associated with a brand participating in a brand uplift experiment, the content selection module 130 can determine whether or not the device identifier associated with the search query used to identify the third-party content item is eligible to participate in the brand uplift experiment. To do so, the content selection module 130 can determine if the device identifier is deemed to already be aware of the brand associated with the brand uplift experiment. In some implementations, to determine if the device identifier is already aware of the brand, the content selection module 130 can perform a lookup of the device identifier's previous search queries from a search query log to see if any of the search queries match a brand keyword included in the list of brand keywords associated with the brand uplift experiment. The content selection module 130 may determine if the device identifier has previously made search queries that include one or more brand keywords included in the list of brand keywords associated with the brand uplift experiment. If the device identifier has previously made search queries that include the brand keywords, there may be a presumption that the device identifier was already aware of the brand and therefore, may bias the experiment. To determine if the device identifier has previously made search queries that include one or more brand keywords included in the list of brand keywords associated with the brand uplift experiment, the content selection module 130 can request to receive a search query log corresponding to the device identifier. The search query log can include each search query requested by the computing device associated with the device identifier. In some implementations, the search query log can be limited to search queries submitted within a predetermined time period before the request for third-party content being handled by the content selection module 130. The content selection module 130 can, for a request for third-party content, identify the device identifier, retrieve the search query log of the device identifier, and determine if the device identifier made any search queries that included a keyword included in the list of brand keywords associated with the brand uplift experiment.

In some implementations, the content selection module 130 can employ other techniques to determine if the device identifier is already aware of the brand. If the content selection module 130 determines that the device identifier is already aware of the brand, the device identifier cannot participate in the brand uplift experiment for this particular brand. As such, the content selection module 130 can provide the third-party content item for display to the end user computing device associated with the device identifier if the third-party content item is selected for display.

As described above, in some implementations, the brand uplift experiment can have one or more parameters according to which the brand uplift experiment is performed. In some implementations, the advertiser may set geographic parameters, time of day parameters, budgetary parameters, among others. For instance, the advertiser may choose to perform the brand uplift experiment on end user computing devices identified as being in Massachusetts. The advertiser may choose to perform the brand uplift experiment during the hours of 7 pm to 11 pm on Tuesdays, perhaps, because that is when a TV show for which the brand uplift experiment is being performed is aired on TV. In addition, the advertiser may otherwise set parameters, for example, to limit the experiment to a predetermined threshold, for example, 20%, of all search queries in which ads of the advertiser may be displayed. Other parameters may also be used to limit the pool of device identifiers that are eligible to participate in the brand uplift experiment.

Responsive to the content selection module 130 determining that the device identifier can participate in the brand uplift experiment, the content selection module 130 may determine if the device identifier is to be included in an experimental arm or the control arm of the brand uplift experiment. In some implementations, the content selection module 130 can randomly assign a device identifier to the experimental arm or control arm. In some implementations, the content selection module 130 can alternately assign device identifiers to the experimental arm or the control arm in the order in which the requests for content is received by the content selection module 130.

The content selection module 130 can be configured to provide a third-party content item identified as promoting the brand corresponding to the brand uplift experiment upon assigning, to the experimental arm, the device identifier of the end user computing device to which the third-party content item is being provided. In this way, each device identifier included in the experimental arm of the brand uplift experiment can be exposed to third-party content items that promote a particular brand. In some implementations, the third-party content items can include content that includes one or more brand keywords that the brand uplift experiment will use to measure brand uplift.

Conversely, the content selection module 130 may not provide third-party content items of the brand for which the brand uplift experiment is being performed to end user computing devices associated with device identifiers included in the control arm. In some implementations, the control arm and the experimental arm can be reversed. In such implementations, the content selection module 130 may provide third-party content items of the brand for which the brand uplift experiment is being performed to end user computing device associated with device identifiers included in the control arm and not provide third-party content items of the brand for which the brand uplift experiment is being performed to end user computing device associated with device identifiers included in the experimental arm.

The content selection module 130 can be configured to determine to display third-party content items of the first set of content items to a first subset of the plurality of computing devices. The first set of content items can include third-party content items that are suitable for display with the search results to the search query. Each of the first set of content items can identify the brand corresponding to the brand uplift experiment. The first set of the plurality of computing devices can correspond to end user computing devices that are associated with device identifiers that are assigned to the experimental arm. As stated above, the content selection module 130 can assign a device identifier to one of the experimental arm or the control arm. In some implementations, the content selection module 130 can assign the device identifier responsive to determining that the device identifier is eligible to participate in the experiment. If the device identifier is assigned to the experimental arm, the content selection module 130 can determine that the third-party content item associated with the brand can be provided for display at the end user computing device associated with the device identifier.

The content selection module 130 can also be configured to determine to not display the first set of content items to a remaining subset of the plurality of computing devices that are associated with a remaining subset of the device identifiers. The remaining subset of the device identifiers can be assigned to the control arm. The content selection module 130 can be configured to select, for the remaining subset of the plurality of computing devices, third-party content items of a second set of content items. None of the second set of content items may identify or promote the brand associated with the brand uplift experiment.

For each request for content received by the data processing system 110, the content selection module 130 can be configured to provide for display, third-party content items at end user computing devices. Based on whether the device identifier associated with a given end user computing device is assigned to the control arm or the experimental arm, the content selection module 130 can provide third-party content items corresponding to the brand corresponding to the brand uplift experiment. If the device identifier is assigned to the experimental arm, the content selection module 130 proceeds to send the third-party content items that promote the brand for display. Conversely, if the device identifier is assigned to the control arm, the content selection module 130 can identify third-party content items promoting the brand and prevent the third-party content item from displaying. In some implementations, the content selection module can identify a replacement content item that does not promote the brand and provide the replacement content item for display.

The brand uplift calculation module 135 can be configured to identify, from a search query log including search queries associated with the device identifiers of the end user computing devices that are assigned to either the experimental arm or the control arm, a portion of the first subset of device identifiers that performed a search using a search query that included a keyword from a predetermined set of brand keywords associated with the brand. To do so, the brand uplift calculation module 135 can identify the search query logs of each of the device identifiers included in the experimental arm and the control arm. The brand uplift calculation module 135 can then extract data corresponding to search queries made after the third-party content item corresponding to the brand for which the brand uplift experiment is performed is either provided for display to device identifiers of the experimental arm or not provided for display for device identifiers of the control arm. In some implementations, the data corresponding to the search queries can be limited to a predetermined time period from the time the content selection module 130 either displayed the third-party content item or determined not to display the third-party content item.

In some implementations, the content selection module 130 can maintain a log of each third-party content item provided for display. The log can identify one or more of the third-party content item, the brand which it promotes, the time and date at which the third-party content item was provided, the device identifier of the end user computing device to which the third-party content item was provided, the search query used to identify the third-party content item and an indication if the third-party content item is a replacement content item for another third-party content item that the content selection module 130 determined to not provide for display because the device identifier was assigned to the control group, among others.

In some implementations, the content selection module 130 can be configured to determine the performance of each of the third-party content items provided for display. In some implementations, the content selection module 130 may be configured to determine a position within the information resource in which the third-party content item was displayed. In some implementations, the content selection module 130 may be configured to determine a length of time the third-party content item was displayed on the information resource before an action to navigate to another information resource was taken on the end user computing device. In this way, the content selection module 130 can determine if a user at the end user computing device had a chance to glance or see the third-party content item provided for display. If, for instance, the user takes an action that navigates the browser to a different information resource within a predetermined time period, such as 3 seconds, the content selection module 130 can determine that the content item provided for display did not receive a valid impression. Accordingly, for the purposes of the brand uplift experiment, the content selection module should not include the device identifier of this end user computing device in the experimental arm as the user likely did not have a chance to see and process the third-party content item. Similarly, if the third-party content item is of low quality in terms of relevance to the search term, the content selection module 130 can also not include the device identifier associated with the low quality third-party content item in the experimental arm for the purposes of determining the first brand awareness metric value. Other rules may be defined that may allow the content selection module 130 to ignore a device identifier in the calculation of the first brand awareness metric value if the content item was unable to get the user's attention. In some implementations, the content selection module 130 can update the log of each third-party content item provided for display to reflect third-party content item impressions that may be deemed to be invalid.

In some implementations, the brand uplift calculation module 135 can retrieve the search query logs of each of the device identifiers included in the brand uplift experiment on a periodic basis, for example, daily, weekly, among others. The brand uplift experiment can be scheduled for a particular length of time and at the end of the brand uplift experiment, the brand uplift calculation module 135 can begin processing data to determine one or more metrics related to brand uplift. In some implementations, the search query log can include search queries associated with a device identifier that were submitted with a search request after the third-party content item promoting the brand was displayed at the end user computing device associated with the device identifier.

The brand uplift calculation module 135 can be configured to identify, for a given device identifier of the experimental arm, from a search query log corresponding to the device identifier, whether or not the device identifier performed a search query that included a keyword in the list of brand keywords. The brand uplift calculation module 135 can analyze entries in the search query log from the time the content selection module 130 provided the third-party content item promoting the brand for display till the end of the experiment.

The brand uplift calculation module 135 can be configured to determine a first brand awareness metric value by determining a number of device identifiers in the experimental arm that performed a search query that included a keyword included in the list of brand keywords. As such, the brand uplift calculation module 135 can identify and analyze, for each of the device identifiers assigned to the experimental arm, the search query logs of the device identifier to identify if the search query log includes a search query that included a keyword from the predetermined set of brand keywords associated with the brand after the content selection module 130 provided the third-party content item promoting the brand for display at the end user computing device associated with the device identifier. The brand uplift calculation module 135 can then determine a ratio of the number of device identifiers that performed a search query that included a keyword from the predetermined set of brand keywords associated with the brand to a total number of device identifiers included in the experimental arm of the brand uplift experiment of the brand. In some implementations, the ratio can quantify brand recall for the experimental arm.

In some implementations, the data processing system 110 can determine the first brand awareness metric value by providing, to the device identifiers assigned to the experimental arm, a survey including information associated with the brand and receiving, from the device identifiers of the experimental arm, survey responses. The data processing system can then determine, from the survey responses, a ratio of the number of device identifiers assigned to the experimental arm that identified the brand to the total number of device identifiers assigned to the experimental arm.

The brand uplift calculation module 135 can be configured to identify, for a given device identifier of the control arm, from a search query log corresponding to the device identifier, whether or not the device identifier performed a search query that included a keyword in the list of brand keywords. The brand uplift calculation module 135 can analyze entries in the search query log from the time the content selection module 130 determined not provide a third-party content item promoting the brand for display till the end of the experiment. In some implementations, the time at which the content selection module 130 determined to not provide a third-party content item promoting the brand for display can be a roughly the same as a time at which the content selection module 130 provided for display, a replacement third-party content item not promoting the brand.

The brand uplift calculation module 135 can be configured to determine a second brand awareness metric value by determining a number of device identifiers in the control arm that performed a search query that included a keyword included in the list of brand keywords. As such, the brand uplift calculation module 135 can identify and analyze, for each of the device identifiers assigned to the control arm, the search query logs of the device identifier to identify if the search query log includes a search query that included a keyword from the predetermined set of brand keywords associated with the brand after the content selection module 130 determined to not provide the third-party content item promoting the brand for display at the end user computing device associated with the device identifier. The brand uplift calculation module 135 can then determine a ratio of the number of device identifiers that performed a search query that included a keyword from the predetermined set of brand keywords associated with the brand to a total number of device identifiers included in the control arm of the brand uplift experiment of the brand. In some implementations, the ratio can quantify brand recall for the control arm.

In some implementations, the data processing system 110 can determine the second brand awareness metric value by providing, to the device identifiers assigned to the control arm, a survey including information associated with the brand and receiving, from the device identifiers of the control arm, survey responses. The data processing system can then determine, from the survey responses, a ratio of the number of device identifiers assigned to the control arm that identified the brand to the total number of device identifiers assigned to the control arm.

The brand uplift calculation module 135 can be configured to compute a brand uplift metric value indicating an uplift in brand awareness of the brand based on the first brand awareness metric value and the second brand awareness metric value. The brand uplift metric value can be a percentage change between the first brand awareness metric value and the second brand awareness metric value. In some implementations, to compute the brand uplift metric value, the brand uplift calculation module 135 can determine the difference in the first brand awareness metric value and the second brand awareness metric value, determine a ratio of the difference to the second brand awareness metric value and multiple the ratio by 100 to get a percentage change in the brand awareness metric value of the experimental arm to the control arm.

The brand uplift calculation module 135 can be configured to display, to a content provider of the first set of content items, the brand uplift metric value. In some implementations, the brand uplift calculation module 135 can provide the brand uplift metric value in an information resource through which the content provider can manage one or more advertising campaigns.

Referring again to FIG. 2A, the information resource 202 shown in FIG. 2A includes three content items 212, 214 and 216. In one instance, the information resource 202 is provided for display to an end user computing device associated with a device identifier assigned to an experimental arm of a brand uplift experiment for Advertiser2. As such, the content item 214 is inserted in the content slot 213 and identifies the brand corresponding to Advertiser2. In FIG. 2A, the keyword 'Super Fast Money Transfer' can be a brand keyword of the advertiser, Advertiser2. A similar content item 222 is shown in the region 220 that includes the brand keyword 'Super Fast Money Transfer.'

Figure 2B:
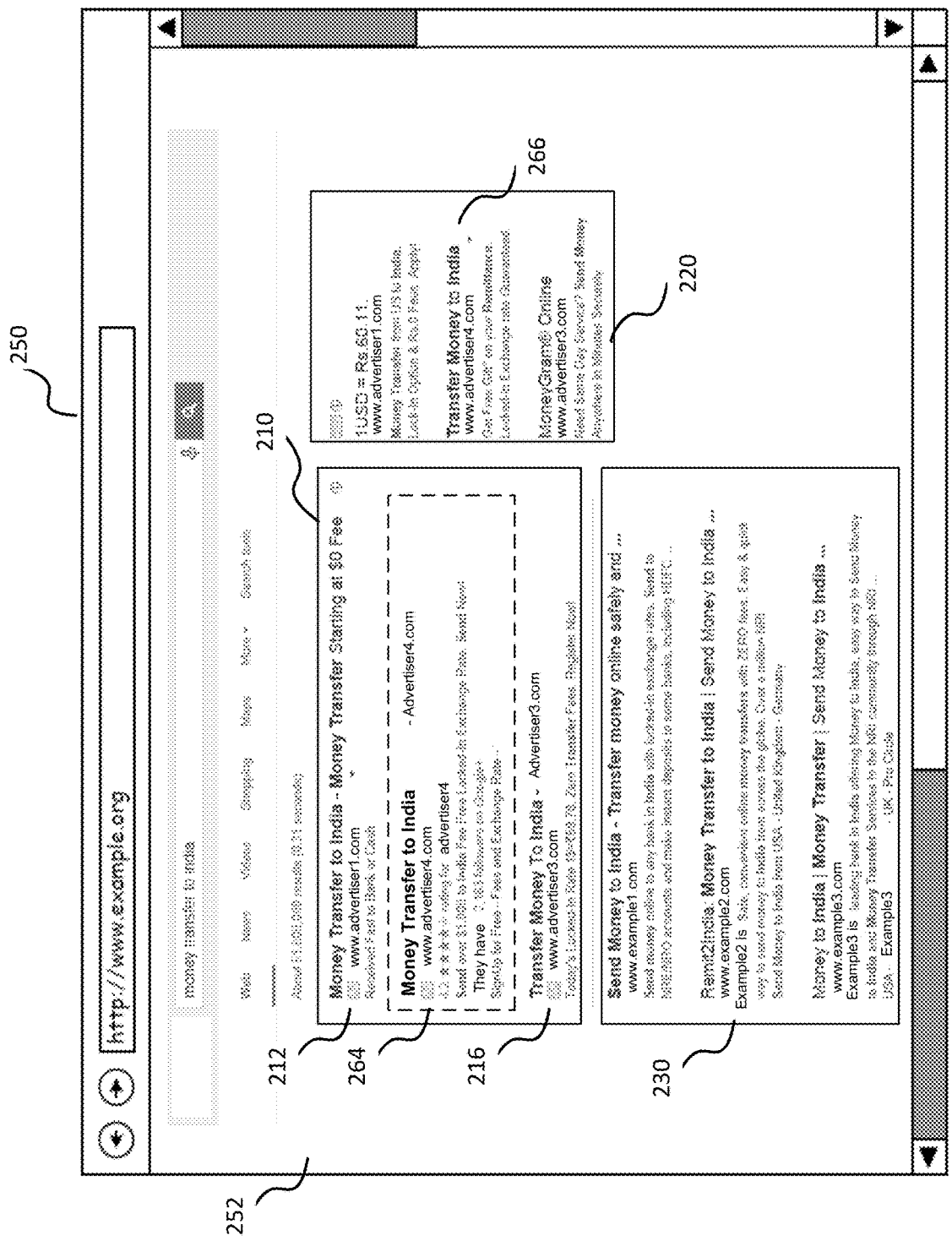
FIG. 2B is a display depicting an online search result document including a third-party content item not identifying the first brand, according to an illustrative implementation.

Referring now to FIG. 2B, FIG. 2B is a display 250 depicting an online search result document 252 including a third-party content item not identifying the first brand. The search result document 252 is similar to the document 202 but differs in that the search result document 252 is provided for display to an end user computing device associated with a device identifier assigned to an control arm of the brand uplift experiment for Advertiser2. As such, for the same search query, the information resource does not include the third-party content items 214 or 222 corresponding to Advertiser2. Rather, replacement third-party content items 264 and 266 are provided for display instead of the content items 214 and 224 shown in FIG. 2A.

In this brand uplift experiment, the data processing system 110 can determine whether a search query log corresponding to the device identifier assigned to the experimental arm includes a search query 'Super Fast Money Transfer,' to see if the device identifier assigned to the experimental arm recalled the brand keyword included in the third-party content item 214. To rule out the possibility that the user in the experimental arm identified the brand keyword 'Super Fast Money Transfer' from any other content item provided on the information resource, the data processing system 110 determines identifier whether a search query log corresponding to the device identifier assigned to the control arm includes a search query 'Super Fast Money Transfer.' If the user of the experimental arm performs a search query with the brand keyword and the user of the control arm does not, the data processing system 110 can assume that the user of the experimental arm learned of the brand keyword from the third-party content items 214 or 222 and can use this to calculate a brand uplift metric value of third-party content items of Advertiser2 that included the keyword 'Super Fast Money Transfer.'

Figure 3A:
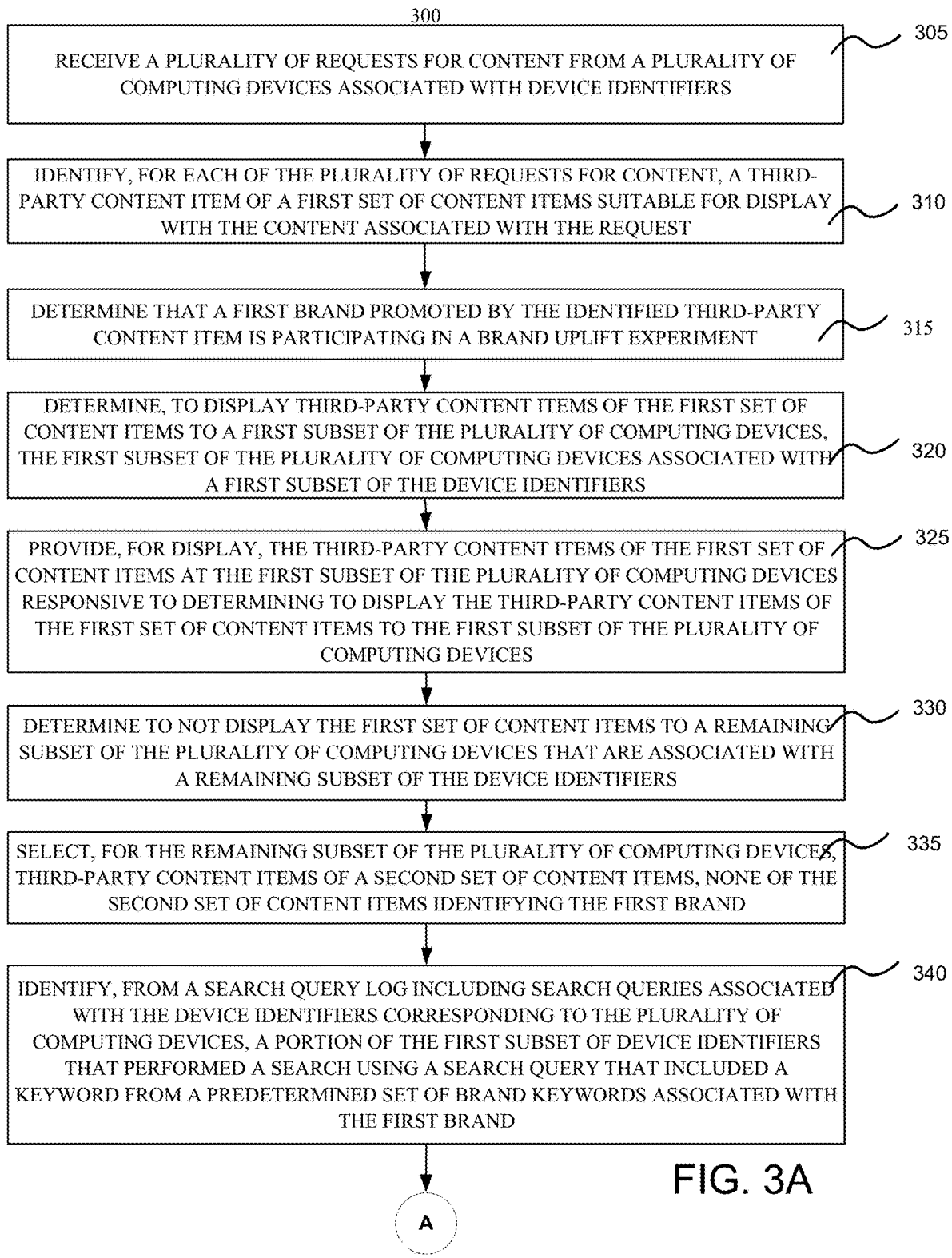
FIGS. 3A and 3B are flow diagrams depicting a method of measuring brand uplift for search campaigns, according to an illustrative implementation.
Figure 3B:
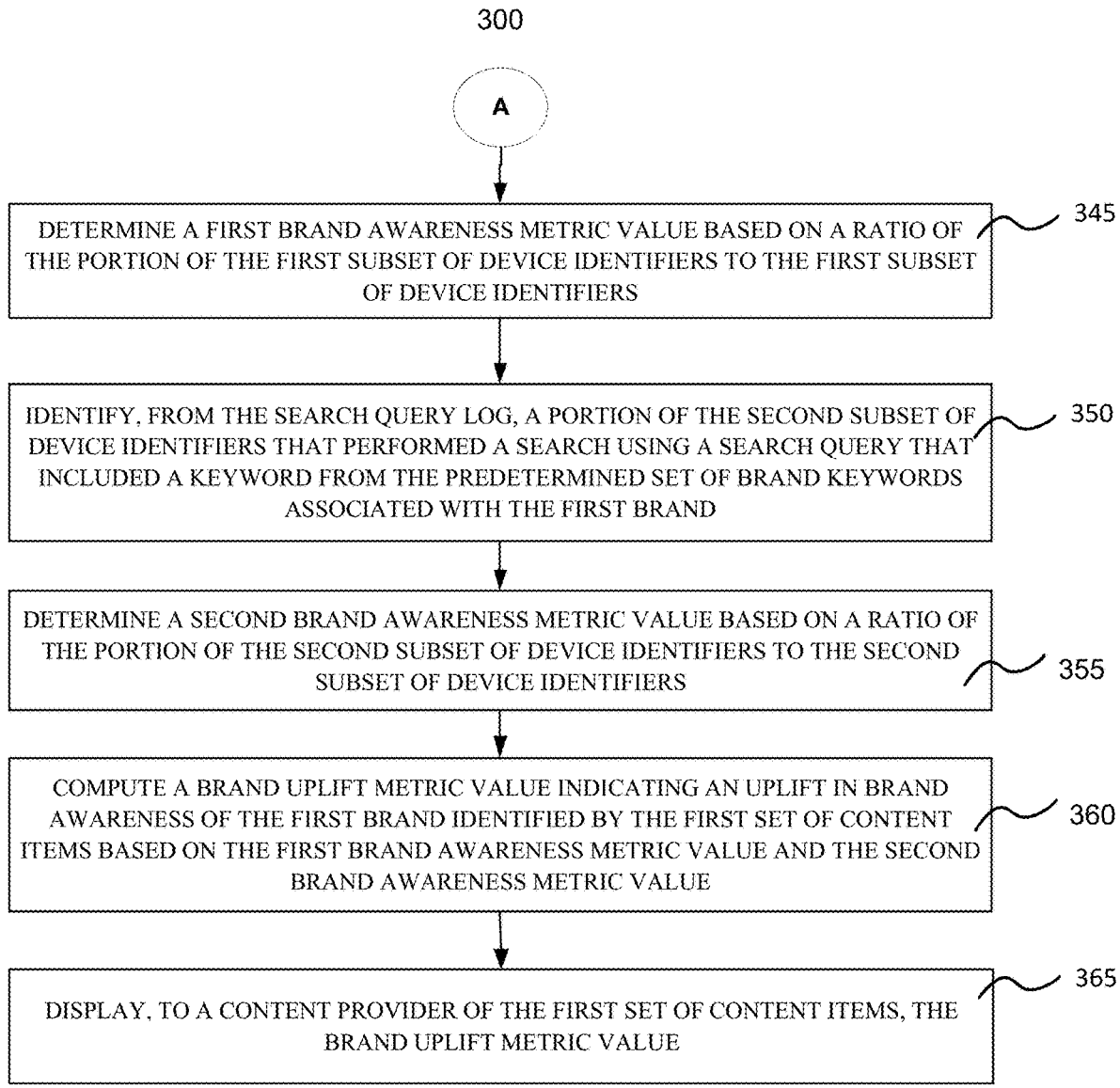

FIGS. 3A and 3B are flow diagrams depicting a method of measuring brand uplift for search campaigns in a computer network environment. The method 300 can receive a plurality of requests for content from a plurality of computing devices associated with device identifiers (BLOCK 305). The method 300 can identify, for each of the plurality of requests for content, a third-party content item of a first set of content items suitable for display with the content associated with the request (BLOCK 310). The method 300 can determine that a first brand promoted by the identified third-party content item is participating in a brand uplift experiment (BLOCK 315). The method 300 can determine, responsive to receiving the requests for content, to display third-party content items of the first set of content items to a first subset of the plurality of computing devices, the first subset of the plurality of computing devices associated with a first subset of the device identifiers (BLOCK 320). The method 300 can provide, for display, the third-party content items of the first set of content items at the first subset of the plurality of computing devices responsive to determining to display the third-party content items of the first set of content items to the first subset of the plurality of computing devices (BLOCK 325). The method 300 can determine to not display the first set of content items to a remaining subset of the plurality of computing devices that are associated with a remaining subset of the device identifiers (BLOCK 330). The method 300 can select, for the remaining subset of the plurality of computing devices, third-party content items of a second set of content items, none of the second set of content items identifying the first brand (BLOCK 335). The method 300 can identify, from a search query log including search queries associated with the device identifiers corresponding to the plurality of computing devices, a portion of the first subset of device identifiers that performed a search using a search query that included a keyword from a predetermined set of brand keywords associated with the first brand (BLOCK 340). The method 300 can determine a first brand awareness metric value based on a ratio of the portion of the first subset of device identifiers to the first subset of device identifiers (BLOCK 345). The method 300 can identify, from the search query log, a portion of the second subset of device identifiers that performed a search using a search query that included a keyword from the predetermined set of brand keywords associated with the first brand (BLOCK 350). The method 300 can determine a second brand awareness metric value based on a ratio of the portion of the second subset of device identifiers to the second subset of device identifiers (BLOCK 355). The method 300 can compute a brand uplift metric value indicating an uplift in brand awareness of the first brand identified by the first set of content items based on the first brand awareness metric value and the second brand awareness metric value (BLOCK 360). The method 300 can display, to a content provider of the first set of content items, the brand uplift metric value (BLOCK 365).

The data processing system can receive a plurality of requests for content from a plurality of computing devices associated with device identifiers (BLOCK 305). Each request corresponds to a request to provide third-party content items for display at an end user computing device. Each request can identify a search query based on which the data processing system can select content items. The request also identifies a device identifier, which the data processing system can use to determine whether or not to provide one or more of the content items selected by the data processing system.

The data processing system can receive a request for content in response to a request from an end user computing device. The request for content can include a request to provide third-party content alongside search results that are to be displayed in a search results information resource. In some implementations, the requests for content can be received directly from end user computing devices associated with device identifiers. In some implementations, the requests for content can be received via another entity, such as the content publisher responsive to the content publisher receiving a request for search results based on a search query. In some implementations, the end user computing device can transmit the request for search results based on the search query to the content publisher via the network. In turn, the content publisher can transmit a request to the data processing system for third-party content items to provide in the search results information resource including the search results generated by the content publisher responsive to the search query. The data processing system can then select one or more third-party content items provided by third-party content providers for display on the search results information resource.

In some implementations, the request for search results generated by the end user computing device can include the search query. In addition, the request for search results can include a device identifier identifying the end user computing device. In some implementations, the device identifier can be unique to the end user computing device. In some implementations, the device identifier can be unique to a user of the end user computing device. In some implementations, the device identifier can be unique to a particular application, for example, a web browser of the end user computing device. The request for third-party content received by the data processing system can include the device identifier associated with the end user computing device that requested search results. In some implementations, the end user computing device can transmit the request for third-party content to the data processing system. In some implementations, the content publisher receiving the request for search results from the end user computing device can transmit the request for third-party content to the data processing system.

The data processing system can identify, for each of the plurality of requests for content, a third-party content item of a first set of content items suitable for display with the content associated with the request (BLOCK 310). In some implementations, the data processing system can identify the search query included in the request and the device identifier identified in the request responsive to receiving a given request of the plurality of requests for third-party content. The data processing system can then identify, via an advertising auction system, one or more third-party content items that are suitable for display with the search results. In some implementations, the data processing system can identify third-party content items via an auction. In some implementations, an auction can be based on the search query, such that advertisers can provide bids to serve third-party content items on the same information resource as search results to the search query provided by the content publisher. The highest bidding content items may then be selected for display.

In some implementations, the data processing system can identify, for the given request, at least one third-party content item of a first set of content items suitable for display on the information resource including the search results to the search query. Each of the first set of content items can identify a brand participating in a brand uplift experiment. In some implementations, each of the first set of content items can promote the same brand participating in the brand uplift experiment. For a given third-party content item of the third-party content items of the first set of content items identified by the data processing system as suitable for display with search results corresponding to the search query, the data processing system can determine the brand the third-party content item is promoting. The data processing system can do so by analyzing the content of the third-party content item or by analyzing the web address or contents of the landing page to which the third-party content item is linked. In some implementations, the data processing system can determine the brand or advertiser the third-party content item is promoting by identifying an advertisement campaign in which the third-party content item is included.

The data processing system can determine that the brand corresponding to the third-party content item is participating in a brand uplift experiment. Once the data processing system determines the identity of the brand or advertiser associated with the content item as described above, the data processing system can determine if the brand is participating in a brand uplift experiment. In some implementations, the data processing system can perform a lookup in a database or table that includes a list of brands that are participating in a brand uplift experiment. If the brand is included in the list of brands, the data processing system can determine that the brand is participating in a brand uplift experiment.

The data processing system can determine that a first brand promoted by the identified third-party content item is participating in a brand uplift experiment (BLOCK 315). To do so, once the data processing system determines the identity of the brand or advertiser associated with the content item as described above, the data processing system can determine if the brand is participating in a brand uplift experiment by performing a lookup in a database or table that includes a list of brands that are participating in a brand uplift experiment. If the brand is included in the list of brands, the data processing system can determine that the brand is participating in a brand uplift experiment.

If the third-party content item is associated with a brand on the list of brands participating in a brand uplift experiment, the data processing system has to execute a set of instructions corresponding to the brand uplift experiment. In some implementations, the data processing system can maintain a list of brands that are participating in a brand uplift experiment. It should be appreciated that the third-party content items can include content that identifies a particular brand. In some implementations, the third-party content item can include text that identifies a brand or one or more keywords that can be associated with the brand. In some implementations, the third-party content item can be an image ad that includes an image that includes content that can be identified with a particular brand.

The data processing system can determine, responsive to receiving the requests for content, to display third-party content items of the first set of content items to a first subset of the plurality of computing devices, the first subset of the plurality of computing devices associated with a first subset of the device identifiers (BLOCK 320). The first set of content items can include third-party content items that are suitable for display with the search results to the search query. Each of the first set of content items can identify the brand corresponding to the brand uplift experiment. The first set of the plurality of computing devices can correspond to end user computing devices that are associated with device identifiers that are assigned to the experimental arm. As stated above, the content selection module 130 can assign a device identifier to one of the experimental arm or the control arm. In some implementations, the content selection module 130 can assign the device identifier responsive to determining that the device identifier is eligible to participate in the experiment. If the device identifier is assigned to the experimental arm, the content selection module 130 can determine that the third-party content item associated with the brand can be provided for display at the end user computing device associated with the device identifier.

The data processing system can determine to not display the first set of content items to a remaining subset of the plurality of computing devices that are associated with a remaining subset of the device identifiers (BLOCK 330). The remaining subset of the device identifiers can be assigned to the control arm. The data processing system can select, for the remaining subset of the plurality of computing devices, third-party content items of a second set of content items. None of the second set of content items may identify or promote the brand associated with the brand uplift experiment. In some implementations, the data processing system can select a content item with the next highest relevancy score The data processing system can select, for the remaining subset of the plurality of computing devices, third-party content items of a second set of content items (BLOCK 335). None of the second set of content items may identify or promote the first brand. For each request for content received by the data processing system, the data processing system can provide for display, third-party content items at end user computing devices. Based on whether the device identifier associated with a given end user computing device is assigned to the control arm or the experimental arm, the data processing system can provide third-party content items corresponding to the brand corresponding to the brand uplift experiment. If the device identifier is assigned to the experimental arm, the data processing system proceeds to send the third-party content items that promote the brand for display. Conversely, if the device identifier is assigned to the control arm, the data processing system can prevent the third-party content item promoting the brand from displaying. In some implementations, the data processing system can identify a replacement content item that does not promote the brand and provide the replacement content item for display.

The data processing system can identify, from a search query log including search queries associated with the device identifiers corresponding to the plurality of computing devices, a portion of the first subset of device identifiers that performed a search using a search query that included a keyword from a predetermined set of brand keywords associated with the first brand (BLOCK 340). In some implementations, the first subset of device identifiers correspond to the device identifiers assigned to the experimental arm. The data processing system can identify the search query logs of each of the device identifiers included in the experimental arm and the control arm. The data processing system can then extract data corresponding to search queries made after the third-party content item corresponding to the brand for which the brand uplift experiment is performed is either provided for display to device identifiers of the experimental arm or not provided for display for device identifiers of the control arm. In some implementations, the data corresponding to the search queries can be limited to a predetermined time period from the time the content selection module 130 either displayed the third-party content item or determined not to display the third-party content item. In some implementations, the search query log includes search queries associated with a device identifier that were submitted with a search request after the third-party content item of the first set of content items was displayed at a computing device associated with the device identifier.

In some implementations, the data processing system can maintain a log of each third-party content item provided for display. The log can identify one or more of the third-party content item, the brand which it promotes, the time and date at which the third-party content item was provided, the device identifier of the end user computing device to which the third-party content item was provided, the search query used to identify the third-party content item and an indication if the third-party content item is a replacement content item for another third-party content item that the data processing system determined to not provide for display because the device identifier was assigned to the control group, among others.

In some implementations, the data processing system can determine the performance of each of the third-party content items provided for display. In some implementations, the data processing system can determine a position within the information resource in which the third-party content item was displayed. In some implementations, the data processing system can determine a length of time the third-party content item was displayed on the information resource before an action to navigate to another information resource was taken on the end user computing device. In this way, the data processing system can determine if a user at the end user computing device had a chance to glance or see the third-party content item provided for display. If, for instance, the user takes an action that navigates the browser to a different information resource within a predetermined time period, such as 3 seconds, the data processing system can determine that the content item provided for display did not receive a valid impression. Accordingly, for the purposes of the brand uplift experiment, the content selection module should not include the device identifier of this end user computing device in the experimental arm as the user likely did not have a chance to see and process the third-party content item. Similarly, if the third-party content item is of low quality in terms of relevance to the search term, the data processing system can also not include the device identifier associated with the low quality third-party content item in the experimental arm for the purposes of determining the first brand awareness metric value. Other rules may be defined that may allow the data processing system to ignore a device identifier in the calculation of the first brand awareness metric value if the content item was unable to get the user's attention. In some implementations, the data processing system can update the log of each third-party content item provided for display to reflect third-party content item impressions that may be deemed to be invalid.

In some implementations, the data processing system can retrieve the search query logs of each of the device identifiers included in the brand uplift experiment on a periodic basis, for example, daily, weekly, among others. The brand uplift experiment can be scheduled for a particular length of time and at the end of the brand uplift experiment, the data processing system can begin processing data to determine one or more metrics related to brand uplift. In some implementations, the search query log can include search queries associated with a device identifier that were submitted with a search request after the third-party content item promoting the brand was displayed at the end user computing device associated with the device identifier.

The data processing system can be configured to identify, for a given device identifier of the experimental arm, from a search query log corresponding to the device identifier, whether or not the device identifier performed a search query that included a keyword in the list of brand keywords. The data processing system can analyze entries in the search query log from the time the data processing system provided the third-party content item promoting the brand for display till the end of the experiment.

The data processing system can determine a first brand awareness metric value based on a ratio of the portion of the first subset of device identifiers to the first subset of device identifiers (BLOCK 345). The data processing system can determine a first brand awareness metric value by determining a number of device identifiers in the experimental arm that performed a search query that included a keyword included in the list of brand keywords. As such, the data processing system can identify and analyze, for each of the device identifiers assigned to the experimental arm, the search query logs of the device identifier to identify if the search query log includes a search query that included a keyword from the predetermined set of brand keywords associated with the brand after the data processing system provided the third-party content item promoting the brand for display at the end user computing device associated with the device identifier. The data processing system can then determine a ratio of the number of device identifiers that performed a search query that included a keyword from the predetermined set of brand keywords associated with the brand to a total number of device identifiers included in the experimental arm of the brand uplift experiment of the brand. In some implementations, the ratio can quantify brand recall for the experimental arm In some implementations, the data processing system can maintain, for the device identifiers assigned to the experimental arm, a counter identifying a number of computing devices associated with the device identifiers assigned to the experimental arm on which any of the third-party content items of the first set of content items was displayed. The data processing system can increment the counter when a third-party content item that is identified by the data processing system to provide for display and includes content promoting the brand receives a valid impression on a computing device on which none of the first set of content items has previously received a valid impression. In some implementations, the data processing system can increment the counter when a third-party content item that is identified by the data processing system to provide for display and includes content promoting the brand receives a valid impression on a computing device on which none of the first set of content items has previously received a valid impression during the course of the brand uplift experiment. In some such implementations, to increment the counter when a content item receives a valid impression, the data processing system can determine a length of time from a time a third-party content item of the first set of content items was displayed on an information resource and a request to access another content item included in the information resource is received and determine that the length of time is above a threshold length of time. If the length of time is below the threshold length of time, the data processing system may deem the impression to be invalid for the purposes of the brand uplift experiment.

In some implementations, the data processing system can determine the first brand awareness metric value by providing, to the device identifiers assigned to the experimental arm, a survey including information associated with the brand and receiving, from the device identifiers of the experimental arm, survey responses. The data processing system can then determine, from the survey responses, a ratio of the number of device identifiers assigned to the experimental arm that identified the brand to the total number of device identifiers assigned to the experimental arm.

The data processing system can identify, from the search query log, a portion of the second subset of device identifiers that performed a search using a search query that included a keyword from the predetermined set of brand keywords associated with the first brand (BLOCK 350). The data processing system can identify, for a given device identifier of the control arm, from a search query log corresponding to the device identifier, whether or not the device identifier performed a search query that included a keyword in the list of brand keywords. The data processing system can analyze entries in the search query log from the time the data processing system can determined to not provide a third-party content item promoting the brand for display till the end of the experiment. In some implementations, the time at which the data processing system determined to not provide a third-party content item promoting the brand for display can be a roughly the same as a time at which the data processing system provided for display, a replacement third-party content item not promoting the brand.

The data processing system can determine a second brand awareness metric value based on a ratio of the portion of the second subset of device identifiers to the second subset of device identifiers (BLOCK 355). The data processing system can determine a second brand awareness metric value by determining a number of device identifiers in the control arm that performed a search query that included a keyword included in the list of brand keywords. As such, the data processing system can identify and analyze, for each of the device identifiers assigned to the control arm, the search query logs of the device identifier to identify if the search query log includes a search query that included a keyword from the predetermined set of brand keywords associated with the brand after the data processing system determined to not provide the third-party content item promoting the brand for display at the end user computing device associated with the device identifier. The data processing system can then determine a ratio of the number of device identifiers that performed a search query that included a keyword from the predetermined set of brand keywords associated with the brand to a total number of device identifiers included in the control arm of the brand uplift experiment of the brand. In some implementations, the ratio can quantify brand recall for the control arm.

In some implementations, the data processing system can determine the second brand awareness metric value by providing, to the device identifiers assigned to the control arm, a survey including information associated with the brand and receiving, from the device identifiers of the control arm, survey responses. The data processing system can then determine, from the survey responses, a ratio of the number of device identifiers assigned to the control arm that identified the brand to the total number of device identifiers assigned to the control arm.

The data processing system can compute a brand uplift metric value indicating an uplift in brand awareness of the first brand identified by the first set of content items based on the first brand awareness metric value and the second brand awareness metric value (BLOCK 360). The brand uplift metric value can be a percentage change between the first brand awareness metric value and the second brand awareness metric value. In some implementations, to compute the brand uplift metric value, the data processing system can determine the difference in the first brand awareness metric value and the second brand awareness metric value, determine a ratio of the difference to the second brand awareness metric value and multiple the ratio by 100 to get a percentage change in the brand awareness metric value of the experimental arm to the control arm.

The data processing system can display, to a content provider of the first set of content items, the brand uplift metric value (BLOCK 365). In some implementations, the data processing system can provide the brand uplift metric value in an information resource through which the content provider can manage one or more advertising campaigns.

Figure 4:
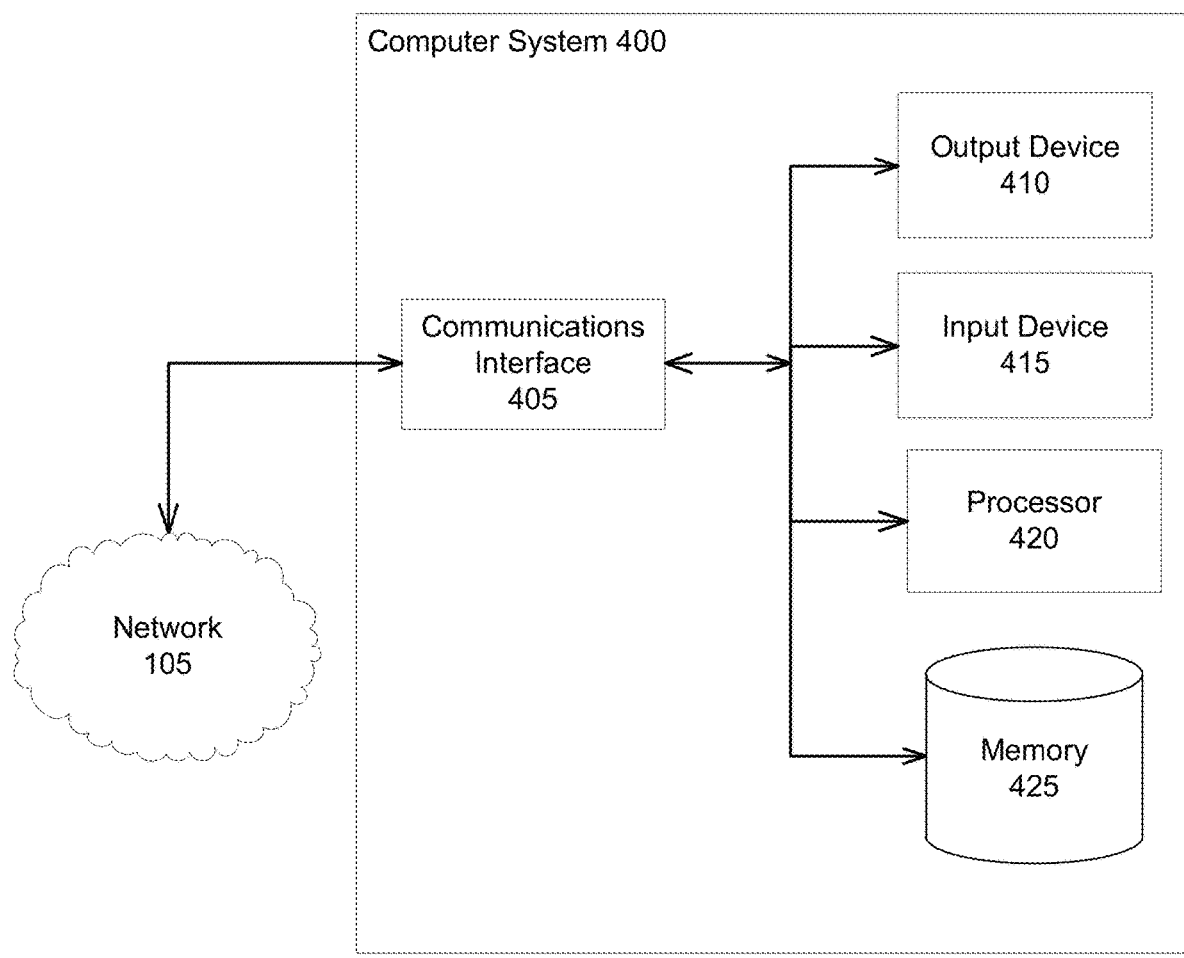
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 110 and its components such as the content selection module 130 and brand uplift calculation module 135) in accordance with some implementations. The computer system 400 can be used to provide information via the network 105 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the data processing system 110 or the other components of the system 110 such as the content selection module 130 and the brand uplift calculation module 135.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 425 to store information related to the availability of inventory of one or more content units, reservations of one or more content units, among others. The memory 425 can include the database 140. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 40. In some implementations, the communications interface(s) may be configured (e.g., via various hardware components or software components) to provide a website as an access portal to at least some aspects of the computer system 400. Examples of communications interfaces 405 include user interfaces (e.g., web pages), through which the user can communicate with the data processing system 40.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content selection module 130 and the brand uplift calculation module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content selection module 130 and the brand uplift calculation module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objec- tives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to identifying the availability of inventory of content units, the systems and methods described herein can be applied to any program in any vertical in which a comparison is performed. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for measuring brand uplift comprising:
receiving, by a data processing system including one or more processors, a plurality of requests for content from a plurality of computing devices associated with device identifiers;
identifying, for each of the plurality of requests for content, a third-party content item of a first set of content items suitable for display with the content associated with the request, each of the first set of content items identifying a first brand;
determining that the first brand promoted by the identified third-party content item is participating in a brand uplift experiment;
determining, by the data processing system, responsive to receiving the request for content, to display third-party content items of the first set of content items to a first subset of the plurality of computing devices, the first subset of the plurality of computing devices associated with a first subset of the device identifiers;
providing, for display, the third-party content items of the first set of content items at the first subset of the plurality of computing devices responsive to determining to display the third-party content items of the first set of content items to the first subset of the plurality of computing devices;
determining to not display the first set of content items to a remaining subset of the plurality of computing devices that are associated with a remaining subset of the device identifiers;
selecting, for the remaining subset of the plurality of computing devices, third-party content items of a second set of content items, none of the second set of content items identifying the first brand;
identifying, from a search query log including search queries associated with the device identifiers corresponding to the plurality of computing devices, a portion of the first subset of device identifiers that performed a search using a search query that included a keyword from a predetermined set of brand keywords associated with the first brand;
determining a first brand awareness metric value based on a ratio of a number of device identifiers in the portion of the first subset of device identifiers to a total number of device identifiers in the first subset of device identifiers;
identifying, from the search query log, a portion of the second subset of device identifiers that performed a search using a search query that included a keyword from the predetermined set of brand keywords associated with the first brand;
determining a second brand awareness metric value based on a ratio of a number of device identifiers in the portion of the second subset of device identifiers to a total number of device identifiers in the second subset of device identifiers;
computing a brand uplift metric value indicating an uplift in brand awareness of the brand identified by the first set of content items based on the first brand awareness metric value and the second brand awareness metric value; and
providing data based on the brand uplift metric value.

2. The method of claim 1, wherein the search query log includes search queries associated with a device identifier that were submitted with a search request after the third-party content item of the first set of content items was displayed at a computing device associated with the device identifier.

3. The method of claim 1, wherein determining the first brand awareness metric value includes:
provide, to the first subset of device identifiers, a survey including information associated with the first brand;
receiving, from the first subset of device identifiers, survey responses; and
determining, from the survey responses, a ratio of a number of device identifiers in a portion of the first subset of device identifiers that identified the brand to the total number of device identifiers in the first subset of device identifiers, the first brand awareness metric value based on the determined ratio.

4. The method of claim 1, wherein determining the second brand awareness metric value includes:
providing, to the second subset of device identifiers, a survey including information associated with the first brand;
receiving, from the second subset of device identifiers, survey responses; and
determining, from the survey responses, a ratio of a number of device identifiers in a portion of the second subset of device identifiers that identified the first brand to the total number of device identifiers in the second subset of device identifiers, the second brand awareness metric value based on the determined ratio.

5. The method of claim 1, further comprising:
maintaining, by the data processing system, for the first subset of device identifiers, a counter identifying a number of computing devices associated with the first subset of device identifiers on which any of the third-party content items of the first set of content items was displayed; and
incrementing the counter when a content item receives a valid impression on a computing device on which none of the first set of content items has previously received a valid impression.

6. The method of claim 5, wherein incrementing the counter when a content item receives a valid impression on a computing device on which none of the first set of content items has previously received a valid impression includes:
determining, responsive to displaying one of the third-party content items of the first set of content items at the first subset of the plurality of computing devices, a length of time from a time a third-party content items of the first set of content items was displayed on an information resource and a request to access another content item included in the information resource is received; and
determining that the length of time is above a threshold length of time.

7. The method of claim 1, further comprising generating, by the data processing system, the predetermined set of brand keywords associated with the first brand by analyzing content associated with the first brand.

8. A system of measuring brand uplift in a computer network environment, comprising:
a data processing system having a content selection module and a brand uplift calculation module, the data processing system configured to:
receive a plurality of requests for content from a plurality of computing devices associated with device identifiers;
identify, for each of the plurality of requests for content, a third-party content item of a first set of content items suitable for display with the content associated with the request, each of the first set of content items identifying a first brand;
determine that the first brand promoted by the identified third-party content item is participating in a brand uplift experiment;
determine, responsive to receiving the requests for content, to display third-party content items of the first set of content items to a first subset of the plurality of computing devices, the first subset of the plurality of computing devices associated with a first subset of the device identifiers;
provide, for display, the third-party content items of the first set of content items at the first subset of the plurality of computing devices responsive to determining to display the third-party content items of the first set of content items to the first subset of the plurality of computing devices;
determine to not display the first set of content items to a remaining subset of the plurality of computing devices that are associated with a remaining subset of the device identifiers;
select, for the remaining subset of the plurality of computing devices, third-party content items of a second set of content items, none of the second set of content items identifying the first brand;
identify, from a search query log including search queries associated with the device identifiers corresponding to the plurality of computing devices, a portion of the first subset of device identifiers that performed a search using a search query that included a keyword from a predetermined set of brand keywords associated with the first brand;
determine a first brand awareness metric value based on a ratio of a number of device identifiers in the portion of the first subset of device identifiers to a total number of device identifiers in the first subset of device identifiers;
identify, from the search query log, a portion of the second subset of device identifiers that performed a search using a search query that included a keyword from the predetermined set of brand keywords associated with the first brand;
determine a second brand awareness metric value based on a ratio of a number of device identifiers in the portion of the second subset of device identifiers to a total number of device identifiers in the second subset of device identifiers;
compute a brand uplift metric value indicating an uplift in brand awareness of the first brand identified by the first set of content items based on the first brand awareness metric value and the second brand awareness metric value; and
provide data based on the brand uplift metric value.

9. The system of claim 8, wherein the search query log includes search queries associated with a device identifier that were submitted with a search request after the first set of content items was displayed at a computing device associated with the device identifier.

10. The system of claim 8, wherein to determine the first brand awareness metric value, the data processing system is further configured to:
provide, to the first subset of device identifiers, a survey including information associated with the first brand;
receive, from the first subset of device identifiers, survey responses; and determine, from the survey responses, a ratio of a number of device identifiers in a portion of the first subset of device identifiers that identified the first brand to the total number of device identifiers in the first subset of device identifiers, the first brand awareness metric value based on the determined ratio.

11. The system of claim 8, wherein to determine the second brand awareness metric value, the data processing system is further configured to:
provide, to the second subset of device identifiers, a survey including information associated with the first brand;
receive, from the second subset of device identifiers, survey responses; and
determine, from the survey responses, a ratio of a number of device identifiers in a portion of the second subset of device identifiers that identified the first brand to the total number of device identifiers in the second subset of device identifiers, the second brand awareness metric value based on the determined ratio.

12. The system of claim 8, wherein the data processing system is further configured to:
maintain, for the first subset of device identifiers, a counter identifying a number of computing devices associated with the first subset of device identifiers on which any of the third-party content items of the first set of content items was displayed; and
incrementing the counter when a content item receives a valid impression on a computing device on which none of the first set of content items has previously received a valid impression.

13. The system of claim 12, wherein to increment the counter when a content item receives a valid impression on a computing device on which none of the first set of content items has previously received a valid impression, the data processing system is configured to:
determine, responsive to displaying one of the third-party content items of the first set of content items at the first subset of the plurality of computing devices, a length of time from a time a third-party content items of the first set of content items was displayed on an information resource and a request to access another content item included in the information resource is received; and
determine that the length of time is above a threshold length of time.

14. The system of claim 8, further comprising generating, by the data processing system, the predetermined set of brand keywords associated with the first brand by analyzing content associated with the first brand.

15. A computer readable storage medium storing instructions that when executed by one or more data processors, cause the one or more data processors to perform operations comprising:
receiving, a plurality of requests for content from a plurality of computing devices associated with device identifiers;
identifying, for each of the plurality of requests for content, a third-party content item of a first set of content items suitable for display with the content associated with the request, each of the first set of content items identifying a first brand;
determining that the first brand promoted by the identified third-party content item is participating in a brand uplift experiment;
determining, responsive to receiving the requests for content, to display third-party content items of the first set of content items to a first subset of the plurality of computing devices, the first subset of the plurality of computing devices associated with a first subset of the device identifiers;
providing, for display, the third-party content items of the first set of content items at the first subset of the plurality of computing devices responsive to determining to display the third-party content items of the first set of content items to the first subset of the plurality of computing devices;
determining to not display the first set of content items to a remaining subset of the plurality of computing devices that are associated with a remaining subset of the device identifiers;
selecting, for the remaining subset of the plurality of computing devices, third-party content items of a second set of content items, none of the second set of content items identifying the first brand;
identifying, from a search query log including search queries associated with the device identifiers corresponding to the plurality of computing devices, a portion of the first subset of device identifiers that performed a search using a search query that included a keyword from a predetermined set of brand keywords associated with the first brand;
determining a first brand awareness metric value based on a ratio of a number of device identifiers in the portion of the first subset of device identifiers to a total number of device identifiers in the first subset of device identifiers;
identifying, from the search query log, a portion of the second subset of device identifiers that performed a search using a search query that included a keyword from the predetermined set of brand keywords associated with the first brand;
determining a second brand awareness metric value based on a ratio of a number of device identifiers in the portion of the second subset of device identifiers to a total number of device identifiers in the second subset of device identifiers;
computing a brand uplift metric value indicating an uplift in brand awareness of the brand identified by the first set of content items based on the first brand awareness metric value and the second brand awareness metric value; and
providing data based on the brand uplift metric value.

16. The computer readable storage medium of claim 15, wherein the search query log includes search queries associated with a device identifier that were submitted with a search request after the third-party content item of the first set of content items was displayed at a computing device associated with the device identifier.

17. The computer readable storage medium of claim 15, wherein determining the first brand awareness metric value includes:
providing, to the first subset of device identifiers, a survey including information associated with the first brand;
receiving, from the first subset of device identifiers, survey responses; and
determining, from the survey responses, a ratio of a number of device identifiers in a portion of the first subset of device identifiers that identified the brand to the total number of device identifiers in the first subset of device identifiers, the first brand awareness metric value based on the determined ratio.

18. The computer readable storage medium of claim 15, wherein determining the second brand awareness metric value includes:

providing, to the second subset of device identifiers, a survey including information associated with the first brand;

receiving, from the second subset of device identifiers, survey responses; and determining, from the survey responses, a ratio of a number of device identifiers in a portion of the second subset of device identifiers that identified the first brand to the total number of device identifiers in the second subset of device identifiers, the second brand awareness metric value based on the determined ratio.

19. The computer readable storage medium of claim 15, further comprising:

maintaining, for each of the first subset of device identifiers, a counter identifying a number of times one of the third-party content items of the first set of content items was displayed at the computing device associated with the device identifier; and incrementing the counter when a content item receives a valid impression on a computing device on which none of the first set of content items has previously received a valid impression.

20. The computer readable storage medium of claim 19, further comprising generating, by the data processing system, the predetermined set of brand keywords associated with the first brand by analyzing content associated with the first brand.

* * * * *